United States Patent

Hibner et al.

[11] 3,756,672
[45] Sept. 4, 1973

[54] SHAFT DAMPING ARRANGEMENT
[75] Inventors: David H. Hibner, Colchester, Conn.;
Roger J. Comeau, Ware, Mass.
[73] Assignee: United Aircraft Corporation, East Hartford, Conn.
[22] Filed: May 24, 1972
[21] Appl. No.: 256,797

[52] U.S. Cl. .............................. 308/26, 308/189
[51] Int. Cl. .............................................. F16c 27/00
[58] Field of Search ..................... 308/15, 26, 189, 308/187

[56] References Cited
UNITED STATES PATENTS

| | | |
|---|---|---|
| 3,357,757 | 12/1967 | Morley ............................. 308/26 |
| 3,473,853 | 10/1969 | Goss ................................ 308/26 |
| 3,491,536 | 1/1970 | Hadaway ...................... 308/189 R |
| 3,531,167 | 9/1970 | Edge et al. ...................... 308/187 |

*Primary Examiner*—Charles J. Myhre
*Assistant Examiner*—R. H. Lazarus
*Attorney*—Charles A. Warren

[57] ABSTRACT

Imbalance vibration of each of two concentric rotating shafts is damped simultaneously by a single damped bearing. By supporting one of the shafts on a damped bearing which is fixed to ground, and by transmitting imbalance vibration from the other shaft into the first shaft by means of a nondamped intershaft bearing, the imbalance vibration of both shafts is damped by the single damped bearing.

11 Claims, 8 Drawing Figures

SHAFT DAMPING ARRANGEMENT

BACKGROUND OF THE INVENTION

1. Field of the Invention

This invention relates to damping shaft vibration, and more particularly to damping shaft vibration of two concentric rotating shafts using a single damping means.

2. Description of the Prior Art

Where two concentric shafts have critical speeds within their operating ranges, these shafts must usually be damped to prevent failure of the supporting structure due to high vibratory stress and possible shaft failure due to large shaft deflections. Generally, the shafts are supported in a manner requiring the use of separate damping means for each shaft. The damping means is often one or more judiciously placed damped bearings somewhere along the length of each shaft. In gas turbine engines oil damped bearings are often utilized because of their effectiveness, but they are expensive, as are all damped bearings as compared to nondamped bearings.

SUMMARY OF THE INVENTION

One object of the present invention is to reduce the number of damped bearing means necessary to damp whirl motion of each of two concentric shafts.

More particularly, it is an object of the present invention to provide a bearing and support arrangement for two concentric shafts adapted to allow the use of a single damped bearing means to simultaneously damp whirl motion of each of the shafts.

Accordingly, concentric shafts form an annular passageway therebetween, one of said shafts having a span radially supported from a span of the other shaft through an intershaft nondamped bearing, the supporting span of the other shaft being disposed on nonrotating support means through damped bearing means. Vibration of the supported span is transmitted into the supporting span through the intershaft bearing whereupon it is damped by the damped bearing means along with any independent vibration of the supporting span.

This bearing and support arrangement for concentric shafts is sometimes known as a piggy-back design since one of the concentric shafts is radially supported or "hung" from the other shaft. Hanging one span from the other permits a large transmission of energy from the supported span into the supporting span; additionally, disposing the supporting span on the damped bearing means increases the amount of transmitted energy that the damped bearing means is likely to see, resulting in more effective damping of the supported span.

This invention has particular application in gas turbine engines, and is particularly adapted to use with an oil damped bearing having the characteristic wherein the entire radial load from the supporting shaft is transmitted into the nonrotating support means through an oil film. This type of oil damped bearing is able to damp many modes of vibration from both shafts individually and simultaneously since the spring rate and the damping constant of the oil film is determined by the amount of oil compression alone in contrast, for example, to being determined by a mechanical spring and oil film in parallel.

The foregoing and other objects, features and advantages of the present invention will become more apparent in the light of the following detailed description of the preferred embodiment thereof as illustrated in the accompanying drawings.

BRIEF DESCRIPTION OF THE DRAWINGS

FIG. 6 is a schematic representation of nonsynchronous whirl of a shaft.

DESCRIPTION OF THE PREFERRED EMBODIMENT

Figure 1:
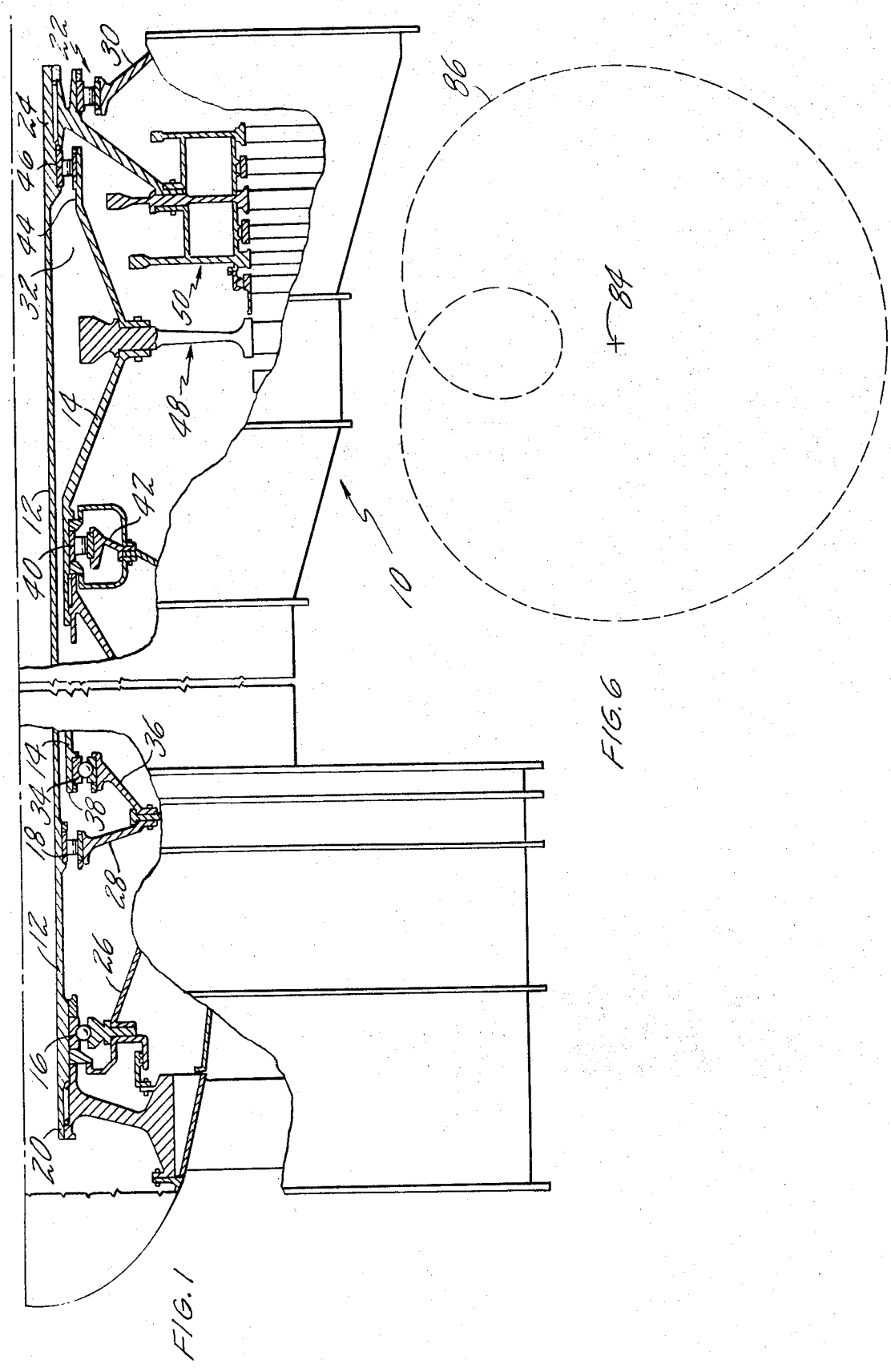
FIG. 1 is a partial elevation view, partly in section of a gas turbine engine embodying the present invention.

Consider, as an example of one application for the present invention, the gas turbine engine 10 as shown in FIG. 1. The engine comprises a low rotor shaft 12 and a high rotor shaft 14. The low rotor shaft 12 is a long thin shaft extending for substantially the entire length of the engine 10; it is supported along its length at three locations: A thrust bearing 16 and a roller bearing 18 near its forward end 20, and a roller bearing 22 near its rearward end 24; the roller bearing 22 is a damped bearing. These bearings are in turn tied to ground through nonrotating support structure 26, 28 and 30, respectively. The high rotor shaft 14 is concentric to the low rotor shaft 12 and outwardly spaced therefrom, forming an annular passageway 32 therebetween. The high rotor shaft is also supported in three locations: A thrust bearing 34 tied to nonrotating support structure 36 supports its forward end 38; a roller bearing 40, tied to nonrotating support structure 42, provides support at a more or less central position along the length of the shaft; and the rearward end 44 of the high rotor shaft 14 is supported or hung from the low rotor shaft 12 by means of an intershaft bearing 46 positioned within the annular passageway 32. The span of high rotor shaft between the roller bearing 40 and the rearward end 44 of the high rotor shaft carries the high pressure turbine, generally represented by the numeral 48. The span of the low rotor shaft between the roller bearings 18, 22 carries the low pressure turbine, generally represented by the numeral 50. As hereinbefore and hereinafter used, the term "span" is defined to mean the portion of shaft extending between any two adjacent bearings tied to ground through nonrotating support structure, or the length of shaft extending from a bearing tied to ground through nonrotating support structure, to the end of the shaft, when no other such bearing intervenes therebetween.

The engine 10 shown in FIG. 1 is designed such that the high and low rotor shafts 12, 14 each have only one critical speed within their operating ranges; and at these critical speeds the maximum whirl amplitudes of the shafts 12, 14 occur in the spans carrying the high pressure turbine 48 and the low pressure turbine 50, respectively. These spans are hereinafter referred to as the high turbine span and low turbine span, respectively. As will hereinafter be made clear, the particular bearing and support arrangement for the high and low rotor shafts has been chosen to allow damping of these shafts at their respective critical speeds by means of a single damper. In this particular application the critical speeds of each of these spans occur substantially simultaneously, requiring the damper to be able to effectively damp two different modes of vibration at the same time, although this may not be a requirement for other applications of this invention.

Figure 2:
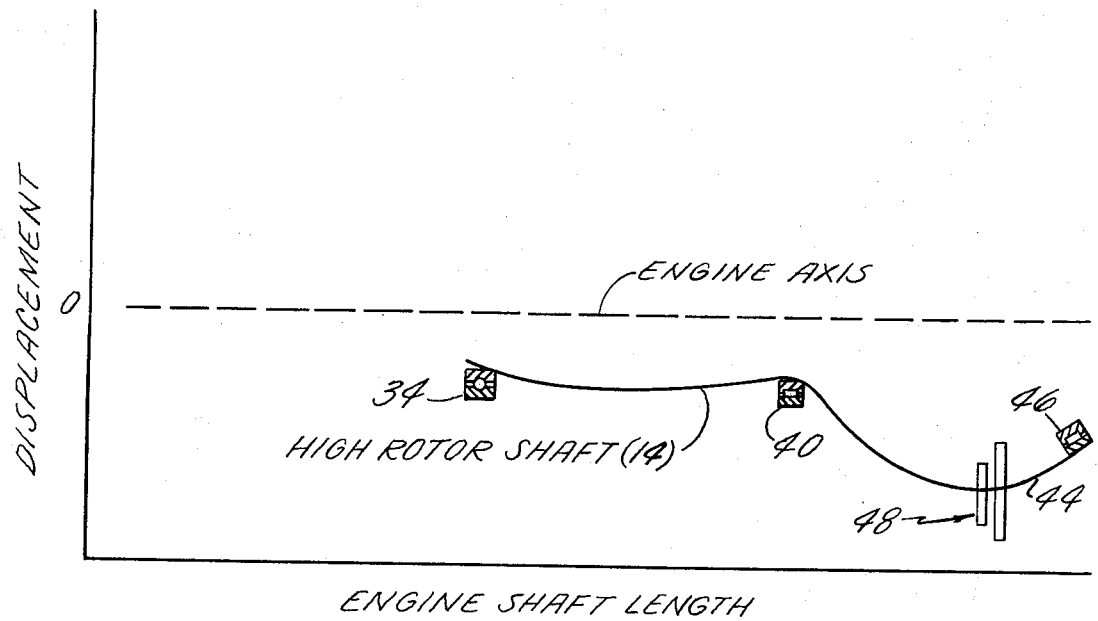
FIG. 2 is a schematic view, graphically illustrating critical speed displacement of the high rotor shaft of the engine shown in FIG. 1.

In accordance with the present invention, the central bearing 40 for the high rotor shaft is a nondamped bearing and the nonrotating support structure to which it is tied is relatively inflexible; on the other hand, the rearward end 44 of the high rotor shaft is actually a free end in that it is not tied to an inflexible support structure. It is relatively free to move in a radial direction. Thus, when the high turbine span whirls or vibrates as a result of the high rotor shaft 14 reaching a critical speed, it will tend to pivot about the central bearing 40. This is represented schematically in FIG. 2, where similar numerals identify the corresponding features of FIG. 1. FIG. 2 shows the displacement of the high rotor shaft at the high rotor critical speed of 11,000 revolutions per minute. Since the high turbine span is supported from the low rotor shaft 12 through the intershaft bearing 46, the high turbine span whirl is actually transmitted through the intershaft bearing 46 into the low rotor shaft, imparting a whirl motion to the low rotor shaft. By positioning the intershaft bearing 46 near the end 44 of the high turbine span, the greatest amount of whirling motion or energy is transmitted into the low turbine span. The damped bearing 22, at the rearward end of the low rotor shaft, effectively damps the whirl motion imparted to the low rotor shaft 12 by the high rotor shaft 14, which, of course, has the effect of damping the high rotor shaft itself.

Figure 3:
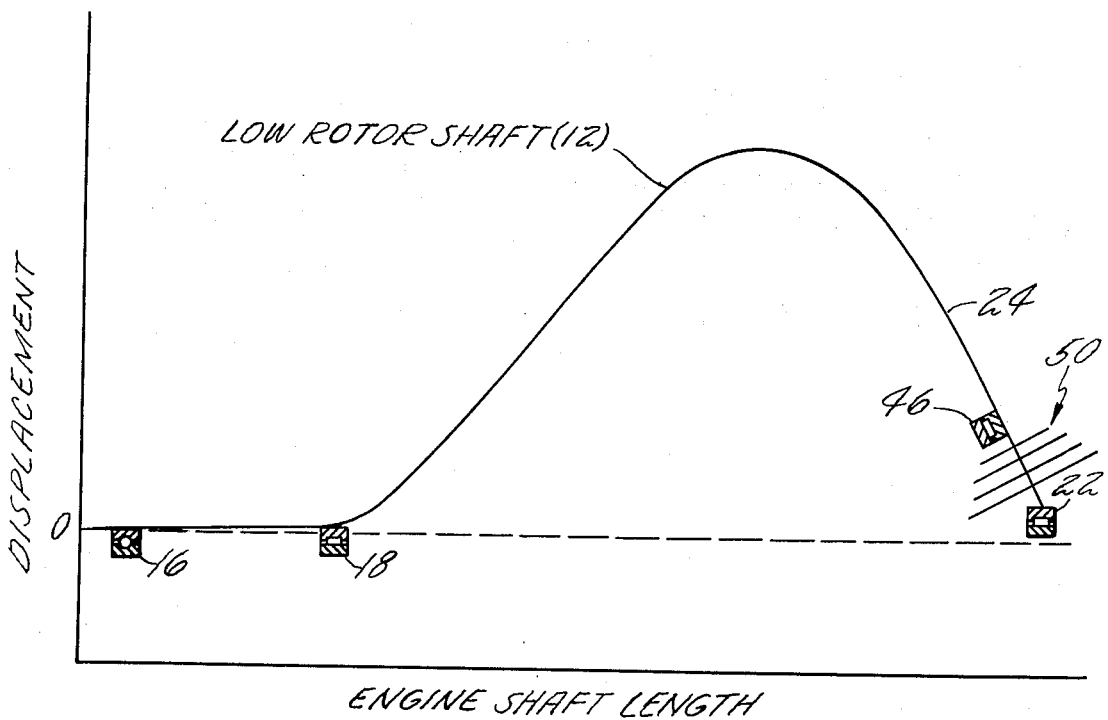
FIG. 3 is a schematic view, graphically illustrating critical speed displacement of the low rotor shaft of the engine shown in FIG. 1.

FIG. 3 is a schematic representation of the low rotor critical speed of 5,500 revolutions per minute. This critical speed is a result of imbalance of the low turbine and, as stated results in a mode of vibration wherein the low turbine span has the maximum whirl amplitude of the low turbine shaft. This low turbine span mode of vibration is also effectively damped by the damped bearing 22. As hereinbefore mentioned, the low rotor and high rotor critical speeds occur substantially simultaneously in the engine 10. Thus, the vibratory motion of the low turbine span requiring damping by the damped bearing 22 is the sum of the vibratory motion imparted by the high rotor shaft at its critical speed and the vibratory motion of the low rotor shaft at its critical speed.

In this exemplary embodiment an oil damped bearing is employed at 22 to accomplish the damping, although other types of bearing dampers may also be effective such as a friction damper or an elastomeric damper; it is advisable to repeat at this time that whatever damping means is chosen, it must be able to damp at least two different modes of shaft vibration—possibly, as in the present example, simultaneously.

The oil damped bearing 22 is best described with reference to FIG. 4. The bearing is more or less typical or roller bearings well known to those skilled in the art and could just as well be a ball bearing. It comprises an inner race 52 fixedly attached to a low turbine rotor support 54 which is in turn splined at 56 to the low rotor shaft 12. A plurality of rollers 58 are circumferentially spaced about the periphery 60 of the inner race. An outer race 62 surrounds the rollers 60 and is in contact therewith. The nonrotating support structure 30 provides a housing 64 for the outer race. The outer race 62 is radially spaced from the housing 64 forming an annular space 66 therebetween. Oil, from a source not shown, enters one end of the annular space 66 through a plurality of holes 69 in the housing; the oil exits through a plurality of holes 70 in the housing at the other end of the annular space. Seals 72 are provided at both ends of the outer race to prevent the loss of oil and oil pressure within the annular space. Thus an oil film extends over the entire axial length of the outer periphery 68 of the outer race, the end 24 of the low turbine span being fully supported by this film; in other words, all radial loads from the low rotor shaft 12 which enter the damped bearing 22 are transmitted to the housing 64 through this oil film, which is on the order of 0.010 inch thick.

Figure 4:
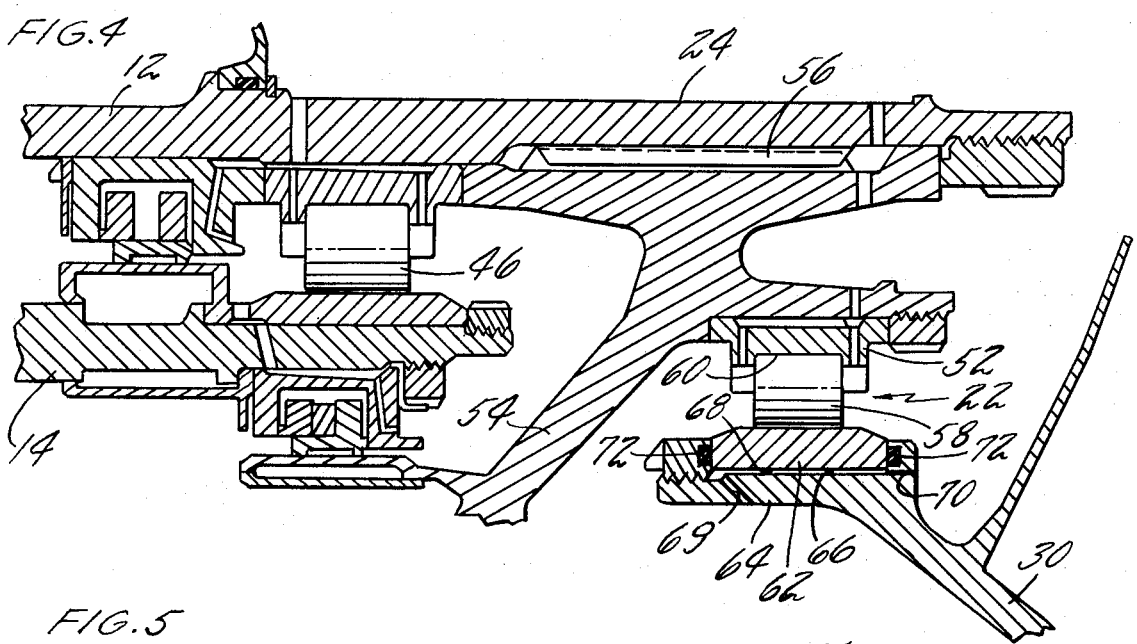
FIG. 4 is a sectional view more clearly showing the bearing arrangement in the turbine area of the engine shown in FIG. 1.
Figure 5:
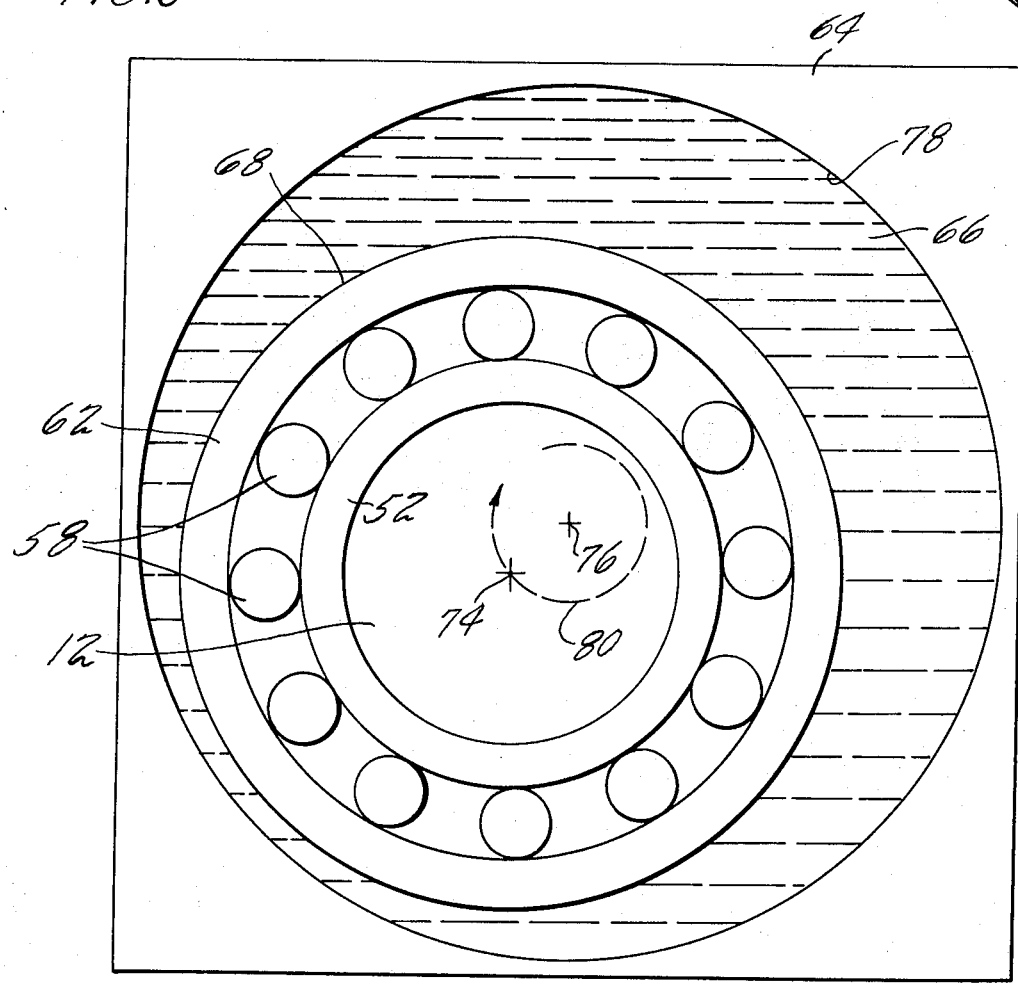
FIG. 5 is a schematic representation of a section taken along the line 5—5 in FIG. 4, illustrating the operation of an oil damped bearing.

To better understand the operation of the damper, reference is now made to FIG. 5, which is a schematic cross section through the housing 64, bearing 22, and low rotor shaft 12, wherein similar numerals correspond to similarly numbered features in FIG. 4. Assume for the purpose of the instant discussion that only a single mode of shaft vibration is being damped. As is well known to those skilled in the art, shaft whirl motion is simply the center of the shaft 74 rotating in a circle about the axis 76 of the engine, which in FIG. 5 is the center of the housing inner diameter 78. The dotted line 80 represents the path which the center of the shaft 74 follows when whirling. This type of circular motion is known as synchronous whirl. As the shaft whirls, the outer diameter 68 of the outer race 62 shears and pumps the oil around the annulus 66 (greatly exaggerated). This takes work or energy. The energy is taken from the whirling of the shaft, thus maintaining the shaft whirl amplitude at an acceptable level.

When the vibratory amplitude of a second shaft, such as the high rotor shaft 14 of the present engine configuration, is added to the vibratory amplitude of the shaft being directly damped, such as the low rotor shaft 12 of the present engine configuration, the motion of the center 74 of the directly damped shaft is no longer a circle. With reference to the schematic drawing shown in FIG. 6, the numeral 84 indicates the engine axis, and the dotted line 86 represents the type of path followed by the center of the low rotor shaft when the high rotor shaft whirl is superimposed upon the low rotor shaft whirl. This motion is known as nonsynchronous whirl. Although those skilled in the art do not believe that an oil damped bearing of the type herein described can effectively damp nonsynchronous whirl, a rig constructed in accordance with the present invention has demonstrated otherwise.

As is apparent from the foregoing discussion, an oil damper of the type shown schematically in FIG. 5 can only effectively damp shaft whirl when that whirl occurs at the point along the shaft axial length which imparts radial motion to the bearing. In other words an oil damped bearing depends on radial motion of the bearing with respect to the housing to transfer vibratory energy from the shaft into the oil film. If a node occurs along the shaft length at the point where the bearing supports the shaft or very close thereto, then there will be no radial motion of the bearing and thus no transfer of energy from the shaft into the oil film; in that instance the whirling motion of the shafts will not be effectively damped. Also, certain critical speeds may cause an unacceptable whirl amplitude in one span of shaft that results in only a small whirl amplitude in the span of shaft being supported by the damped bearing. In that instance a second damped bearing may be required elsewhere along the shafts. It is important to understand that this invention does not preclude the use of such a second damped bearing; the invention is in being able to damp at least one critical speed of each shaft through a single damped bearing. The shafts may have other critical speeds wherein almost all the shaft whirl energy is in a span so far removed from the damped bearing that the bearing sees little motion and is ineffective.

From the foregoing principles and description of an exemplary embodiment of the present invention, it should be apparent that various other bearing and support arrangements for concentric shafts, embodying all the features of the present invention, may be devised such that only a single damper may be utilized to damp vibrations from both shafts.

Figure 7:
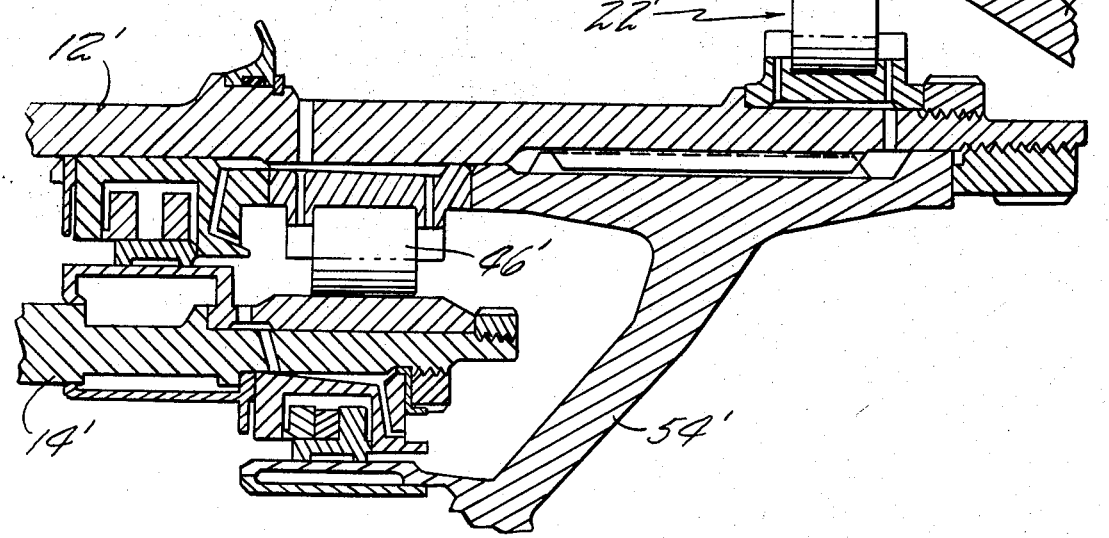

As one example of an alternative method for supporting and damping the shafts of an engine configuration similar to that shown in FIG. 1, reference is made to FIG. 7. By comparing FIG. 7 with FIG. 5 it is noted that the only change is placing the damped bearing and its nonrotating support structure inside the low rotor shaft. Primed numerals in FIG. 7 correspond to similarly numbered features of FIG. 5.

Figure 8:
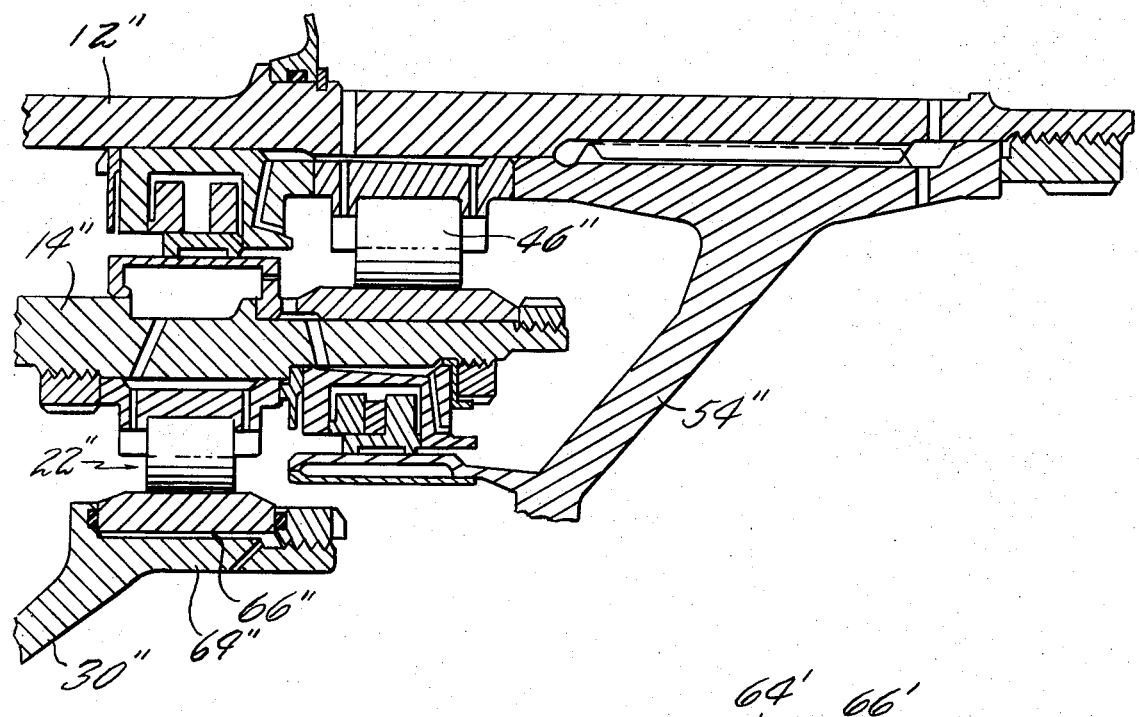
FIGS. 7 and 8 are sectional views showing modifications of the bearing arrangement of FIG. 4.

FIG. 8 shows a somewhat different arrangement wherein the damped bearing and nonrotating support structure directly support the rearward end of the high turbine span. The low turbine span of the low rotor shaft is supported by the high rotor shaft through the intershaft bearing. In FIG. 8 double primed numerals correspond to similarly numbered features of FIG. 5. In this arrangement low turbine span whirl is transmitted through the intershaft bearing 46″ into the high rotor shaft 14″ whereupon it is damped by the damped bearing 22″ along with whirl of the high turbine span. It is not advisable in this instance to axially align the intershaft bearing with the damped bearing, for in that situation there would be more of a likelihood that a node will occur at the axial location of the damped bearing.

Although the invention has been shown and described with respect to preferred embodiments thereof, it should be understood by those skilled in the art that various changes and omissions in the form and detail thereof may be made therein without departing from the spirit and scope of the invention.

Having thus described typical embodiments of our invention, that which I claim as new and desire to secure by Letters Patent of the United States is:

1. A bearing and support arrangement for concentric shafts comprising:
   nonrotating support means;
   damped bearing means disposed on said support means;
   first shaft means having at least one span, one end of said span being rotatably disposed on said damped bearing means and being radially supported thereby;
   second shaft means concentric whith said first shaft means and forming an annular passageway therebetween; and
   nondamped bearing means disposed on said first shaft span and within said annular passageway, said second shaft means having a span disposed on said nondamped bearing means, and hung from said first shaft span through said nondamped bearing means, said nondamped bearing being adapted to transmit whirling motion of said second shaft span into said first shaft span, said damped bearing means being adapted to damp whirling motion of said first shaft span and of said second shaft span, said damped bearing being the only damped bearing means for damping whirling motion of said spans.

2. The bearing and support arrangement according to claim 1 wherein said damped bearing means is an oil damped bearing means including an annulus of oil, and said end of said first shaft span is fully supported by said annulus of oil.

3. The bearing and support arrangement according to claim 1 wherein said damped bearing means is axially spaced from said nondamped bearing means.

4. The bearing and support arrangement according to claim 1 wherein said first and second shaft means are gas turbine engine shafts.

5. The bearing and support arrangement according to claim 1 wherein said second shaft span has a free end, and is hung at its free end from said first shaft span through said nondamped bearing means.

6. In an engine including a low rotor shaft and a high rotor shaft, the high rotor shaft being concentric with the low rotor shaft and outwardly spaced therefrom forming an annular passageway therebetween, the high rotor shaft having a span with a free end and the low rotor shaft having at least one span, a bearing and support arrangement for the low and high rotor shafts comprising:
   nonrotating support means;
   damped bearing means disposed on said support means, the end of the low rotor span being rotatably disposed on said damped bearing means;
   nondamped bearing means positioned within the annular passageway, said low rotor span being rotatably disposed on said nondamped bearing means, and the free end of the high rotor span being rotatably disposed on said nondamped bearing means and hung from said low rotor span therethrough, said nondamped bearing means adapted to transmit whirling motion of said high rotor span into said low rotor span, said damped bearing means adapted to damp whirling motion of said high and low rotor spans, and said damped bearing means being the only damped bearing means for damping the whirling motion of both spans.

7. The bearing and support arrangement according to claim 6 wherein said damped bearing means is an oil damped bearing means including an annulus of oil, and said end of said low rotor span is fully supported by said annulus of oil.

8. The bearing and support arrangement according to claim 6 wherein said low rotor shaft has a critical speed within its operating range and said high rotor shaft has a critical speed within its operating range, and said damped bearing means is the only damped bearing means for damping the whirling motion of said high and low rotor spans at said critical speeds.

9. In an engine including a low rotor shaft and a high rotor shaft, the high rotor shaft being concentric with the low rotor shaft and outwardly spaced therefrom forming an annular passageway therebetween, the low rotor shaft having a span with a free end and the high rotor shaft having at least one span, a bearing and support arrangement for the low and high rotor shafts comprising:
  nonrotating support means;
  damped bearing means disposed on said support means, the end of the high rotor span being rotatably disposed on said damped bearing means;
  nondamped bearing means positioned within the annular passageway, said high rotor span being rotatably disposed on said nondamped bearing means, and the free end of the low rotor span being rotatably disposed on said nondamped bearing means and hung from said high rotor span therethrough, said nondamped bearing means adapted to transmit whirling motion of said low rotor span into said high rotor span, said damped bearing means adapted to damp whirling motion of said high and low rotor spans, and said damped bearing means being the only damped bearing means for damping the whirling motion of both spans.

10. The bearing and support arrangement according to claim 9 wherein said damped bearing means is an oil damped bearing means including an annulus of oil, and said end of said high rotor span is fully supported by said annulus of oil.

11. The bearing and support arrangement according to claim 9 wherein said low rotor shaft has a critical speed within its operating range and said high rotor shaft has a critical speed within its operating range, and said damped bearing means is the only damped bearing means for damping the whirling motion of said high and low rotor spans at said critical speeds.

* * * * *